Patented Oct. 16, 1951

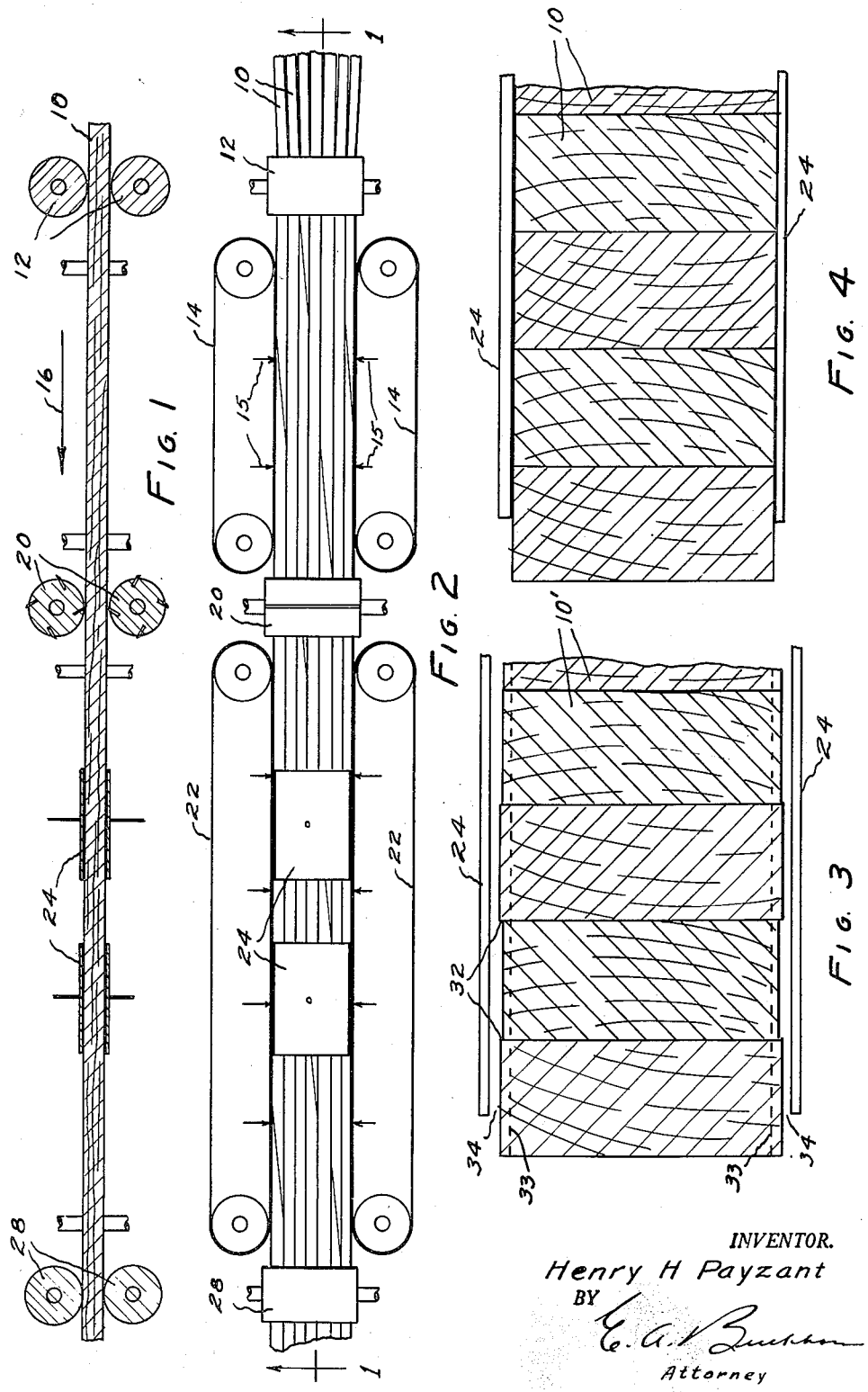

2,571,604

UNITED STATES PATENT OFFICE 2,571,604

MANUFACTURE OF LAMINATED WOODEN MEMBERS

Henry H. Payzant, Seattle, Wash., assignor, by mesne assignments, to Timber Structures, Inc., Portland, Oreg., a corporation of Delaware Application July 22, 1946, Serial No. 685,307

3 Claims. (Cl. 154—116)

The present invention relates to new and improved methods for manufacturing laminated wooden members.

It has been common practice heretofore in the manufacture of laminated wooden members to assemble a plurality of wooden strips, with adhesive applied to one or both of the adjacent surfaces of the strips, in a press and upon completion of the assembly to apply clamping pressure across the assembly and maintain such pressure until the adhesive has set. To reduce the clamping time, thermo-setting adhesives are sometimes used and which may be set by high frequency currents passed through the member. After the adhesive has set the member is removed from the press and then passed through a planer for surfacing the opposite sides thereof. Such process is relatively slow, inefficient and results in an extremely high cost for the finished product.

It is an object of the present invention, therefore, to provide a new and improved method for manufacturing glued laminated wooden members which is efficient and economical.

A further object is to provide a new and improved method for manufacturing laminated wooden members and which is adaptable for use in a continuous flow process.

Another object is to provide a new and improved method for manufacturing laminated wooden members employing a thermo-setting adhesive, the amount of heat energy required for effecting setting of the adhesive being less than that required according to methods heretofore commonly used.

A still further object of the invention is to provide a new and improved, continuous flow method for manufacturing laminated wooden members wherein a thermo-setting adhesive is employed and which is set by high frequency currents applied to the adhesive films more efficiently than according to previous methods.

In accordance with the modification of the invention as herein described, a plurality of wooden strips are assembled in a side by side relation with a film of thermo-setting adhesive between the adjacent surfaces of the strips, the assembly is then compressed and moved with a continuous flow, first between a pair of planer heads for providing smooth surfaces on the opposite sides of the assembly and then between a plurality of electrodes of a radio frequency generator apparatus, the electrodes contacting with the glue lines on each of the opposite sides of the assembly and the pressure being maintained across the assembly until the adhesive has set.

In the drawings, Fig. 1 is a longitudinal section diagrammatically illustrating a typical arrangement of apparatus for carrying out the method of the invention in accordance with one modification thereof; Fig. 2 is a plan view of the apparatus illustrated in Fig. 1; Figs. 3 and 4 are enlarged diagrammatic views illustrating certain aspects of the present invention.

Referring now to the drawings, the method of the present invention comprises assembling a plurality of longitudinal wooden strips 10 in a side by side relation with a film of adhesive between the adjacent surfaces of the strips and which are fed between a pair of driven rollers 12 arranged above and below the assembly. The rolls 12 force the strips into a common or horizontal plane. From the rolls 12 the assembly then passes between a pair of continuously moving pressure applying means 14 which means force the strips 10 tightly together. The means are merely diagrammatically illustrated and may comprise continuous chains or belts which travel in the direction of the arrow 16, it being understood that pressure is applied therethrough to the opposite edges of the assembly throughout the full length of the belts as indicated by the force vectors 15. Such means are well known in the art and need not be described in detail. Immediately behind the pressure belts 14 are arranged a pair of surfacing heads 20 above and below the line of travel of the assembly, which heads may be provided with planer knives for planing the upper and lower surfaces of the assembly. Upon emerging from between the planer heads 20 the assembly of strips then passes between a pair of moving pressure applying means 22 which may be similar to the pressure applying means 14 as previously described. The space between the means 14 and 22 is sufficiently short so that pressure is maintained across the assembly therebetween. Means are also provided after the surfacing heads 20 for effecting a rapid heating of the adhesive films between the adjacent strips of the assembly as it passes through the pressure applying means 22. While any suitable heating means may be employed, it is preferred to use a high frequency generator, the electrodes of which are indicated at 24. The capacity of the heating means 24 and the length of the pressure applying means 22, as well as the speed of travel of the assembly of strips, are so adjusted that the adhesive is fully set by the time that the assembly emerges from the after end of the pressure applying means 22. A pair of horizontal rolls 28 are shown at the discharge end of the apparatus for further minimizing any tendency for the assembly to warp or buckle while passing through the machine. Other such rolls may be provided where necessary throughout the length of travel of the assembly of strips through the machine.

In any laminating operation a certain amount of adhesive will always be forced from between adjacent surfaces of the assembled strips and which will be required to be removed from the surface of the finished member so that, irrespective as to whether or not the strips are smooth surfaced prior to their assembly, the assembly must be again surfaced to remove the excess adhesive at the opposite edges of the glue lines. Ordinarily this final surfacing is done after the glue has set and the assembly removed from the clamping press. It is uneconomical, therefore, to surface the outer sides of the strips prior to their assembly and, ordinarily, strips will be used having rough outer edges resulting from the sawing of the individual strips to the approximate width of the thickness for the laminated member. In such rough sawing operations the width of the boards will vary more or less so that after they are assembled one or both side surfaces of the assembly will be inherently uneven as illustrated diagrammatically in the enlarged fragmentary view of Fig. 3, wherein the edge portions of some strips 10' are shown projecting above the edge of adjacent strips as at 32. This illustrates a typical condition of the assembly of strips 10 between the pressure applying means 14.

While heat may be applied to the adhesive films for effecting setting thereof prior to passage of the assembly between the surfacing heads, it is preferred not to do so for various reasons. As illustrated in Fig. 3, let it be supposed that the dotted lines 33 indicate the desired final finished surfaces for the laminated member and that the portions outwardly of the lines 33 are required to be removed such as by planing. It is a well known fact that the amount of heating energy required for effecting setting of a glue line varies in accordance with the thickness of the assembly or the total width of the glue line. Thus, assuming that the sum of the thicknesses of the portions to be removed on each of the opposite sides of the assembly amounts to ten percent of the total thickness of the assembly, then at least ten percent more energy would be required for effecting setting of the glue lines across the unfinished assembly than would be required for effecting setting of the glue lines merely between the lines 33.

Furthermore, due to the unevenness and roughness of the surfaces of the assembly, the heating elements or electrodes would be required to be supported at a distance from the opposite surfaces of the assembly as indicated at 34. The loss of heating energy due to the existence of these spaces is very appreciable. Also, unsatisfactory results would be obtained if the electrode plates were brought into contacting relation against the opposite surfaces of the unsurfaced assembly as illustrated in Fig. 3 because of the existence of globules of adhesive forced from between adjacent strips at different points. Good contact would be made through these globules of adhesive to the electrodes at certain points, while no contact would be made with the adhesive film at other points, so that adhesive film only in the regions of good contact would be heated, while the film at other points where no direct contact was made would be only slightly heated, if at all. Then too, the excess adhesive would adhere to the electrodes and become caked thereupon which would require periodic shutdowns for cleaning.

In accordance with the preferred embodiment of the invention, the opposite sides of the assembly of strips are surfaced by the heads 20 after pressure has been maintained across the assembly by means 14 a sufficient period of time to assure that substantially all of the excessive adhesive has been forced from between adjacent surfaces of the strips. The excessive adhesive, as well as the rough and uneven surface portions of the assembly of strips, is removed by the planer heads. Since the upper and lower surfaces of the assembly are left smooth and plane by the heads 20, the electrode plates 24 will make contact with each of the glue lines throughout the length of travel of the assembly adjacent thereto as illustrated in Fig. 4. The glue lines will thus be uniformly heated with a minimum of energy waste. Since the excess adhesive has been remover from the opposite sides of the assembly, and since the setting of the adhesive does not result in any further oozing from the edges of the glue lines, no further finishing of the laminated member is required after the adhesive films have been set. Upon emerging from between the rear rolls 28 the laminated member may be cut up into suitable lengths as desired.

For convenience of illustration and description, the continuously moving pressure applying, or clamping, means 14 and 22 are shown as comprising separate pairs of units with the surfacing heads 20 arranged therebetween, the space between the means 14 and 22 being so short that there is substantially no diminution of pressure across the assembly of strips in this area. It will be obvious to one skilled in the art that a single pair of compression units may be provided of such suitable design that the surfacing heads may be arranged intermediate the ends thereof. Furthermore, the compression means may be arranged for imparting a curvature to the assembly and holding it in such condition during its travel during the setting of the adhesive. Also, strips of predetermined length may be fed through the apparatus for making unit laminated members.

What I claim is:

1. The method of making laminated wooden members utilizing a plurality of longitudinal wooden strips having relatively wide sides and relatively narrow edges, at least some of said wooden strips being of greater width than the remainder, said method comprising the steps of forming an assembly of a plurality of said longitudinal wooden strips in a side by side relation with a film of thermo-setting adhesive between each adjacent pair of strips, applying pressure to the opposite edges of said assembly in a direction normal to said adhesive films to force said adjacent side surfaces of said strips tightly together, the opposite sides of said compressed assembly normal to said adhesive films being uneven due to nonuniform width of said strips, moving said compressed assembly of strips continuously in a direction longitudinally thereof, planing said opposite uneven sides of said assembly while moving under pressure to remove excess wood from the edges of strips of excess width to provide smooth plane surfaces on each of the opposite sides of said assembly normal to the planes of said adhesive films, and passing said assembly between a pair of high-frequency heating electrode means in contacting engagement with the adhesive lines in said plane surfaces while said pressure is maintained upon the opposite edges of said assembly.

2. The method of making laminated wooden members from longitudinal wooden strips of random widths of relatively wide sides and relatively narrow edges, said method comprising the steps of forming an assembly of a plurality of said strips in a side by side relation with films of fluid, thermo-setting adhesive therebetween, applying pressure to the opposite edges of said assembly in a direction normal to said adhesive films to force said adjacent side surfaces of said strips tightly together and squeeze excess adhesive from therebetween, the opposite sides of said compressed assembly normal to said adhesive films being uneven due to nonuniform width of said strips, planing said opposite uneven sides of said assembly normal to said adhesive films to remove excess wood from the edges of said strips and excess adhesive simultaneously from the opposite sides of said assembly while moving under pressure to form parallel smooth planar surfaces on each of the opposite sides of said assembly normal to said adhesive films, and then passing said assembly in contacting engagement of the glue lines in said planar surfaces with opposed high frequency heating means while maintaining said pressure upon the opposite edges of said assembly until the adhesive films between adjacent side surfaces of said strips has set.

3. The method of making smooth-surfaced laminated wooden members from a plurality of longitudinal wooden strips having relatively wide sides and relatively narrow rough edges, said method comprising the steps of forming an assembly of a plurality of said wooden strips in a side by side relation with films of thermo-setting adhesive therebetween and with said rough edges exposed on each of the opposite sides of said assembly, applying pressure to the opposite edges of said assembly normal to the adhesive films to force the adjacent surfaces of said strips tightly together, the opposite sides of said compressed assembly being rough due to the exposed rough edges of the individual strips, moving the compressed assembly of strips continuously in a direction longitudinally thereof, planing said opposite rough sides of said compressed assembly to form smooth parallel planar surfaces upon each of the opposite sides of said assembly normal to said adhesive films while said assembly is in motion and under pressure, and passing said assembly adjacent heating means with said heating means contacting the adhesive lines in said plane surfaces of said assembly for effecting setting of said adhesive films while said assembly is in motion and said pressure maintained.

HENRY H. PAYZANT.

REFERENCES CITED

The following references are of record in the file of this patent:

UNITED STATES PATENTS

| Number | Name | Date |
| --- | --- | --- |
| 1,916,134 | Dike et al. | June 27, 1933 |
| 2,306,151 | Bailey | Dec. 22, 1942 |
| 2,317,281 | Linquist | Apr. 20, 1943 |
| 2,323,105 | Welch | June 29, 1943 |
| 2,378,244 | Pfenning | June 12, 1945 |
| 2,434,573 | Mann et al. | Jan. 13, 1948 |

OTHER REFERENCES

Russell et al. on "Radio-Frequency Technology in Wood Application" published in "Transactions of the A. S. M. E." for August 1944, pages 563–567.